US012625601B2

(12) United States Patent
Rai

(10) Patent No.: US 12,625,601 B2
(45) Date of Patent: May 12, 2026

(54) MULTI-SCREEN VIEW AND NAVIGATION FOR MOBILE APPLICATIONS

(71) Applicant: Verizon Patent and Licensing Inc., Basking Ridge, NJ (US)

(72) Inventor: Pankaj Rai, Uttar Pradesh (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 199 days.

(21) Appl. No.: 18/527,477

(22) Filed: Dec. 4, 2023

(65) Prior Publication Data

US 2025/0181225 A1    Jun. 5, 2025

(51) Int. Cl.
*G06F 3/04845* (2022.01)
*G06F 3/0481* (2022.01)
*G06F 3/14* (2006.01)
*G06F 9/451* (2018.01)

(52) U.S. Cl.
CPC ........ *G06F 3/04845* (2013.01); *G06F 3/0481* (2013.01); *G06F 3/1407* (2013.01); *G06F 9/451* (2018.02)

(58) Field of Classification Search
CPC .................................................. G06F 3/04845
USPC ......................................................... 715/766
See application file for complete search history.

(56) References Cited

U.S. PATENT DOCUMENTS

| | | | | |
|---|---|---|---|---|
| 5,920,313 A * | 7/1999 | Diedrichsen | .......... | G06F 3/0481 |
| | | | | 715/767 |
| 7,433,874 B1 * | 10/2008 | Wolfe | ................ | G06Q 30/0257 |

| | | | | |
|---|---|---|---|---|
| 8,588,860 B2 * | 11/2013 | Sirpal | ................. | H04L 12/1827 |
| | | | | 455/418 |
| 9,285,955 B2 * | 3/2016 | Nezu | ....................... | B60K 35/26 |
| 2003/0101417 A1 * | 5/2003 | Hobrack | ............. | G06F 3/04895 |
| | | | | 715/253 |
| 2007/0124692 A1 * | 5/2007 | Lindsay | .................. | G06T 11/00 |
| | | | | 715/765 |
| 2013/0050131 A1 * | 2/2013 | Lee | .................... | G08G 1/09626 |
| | | | | 345/174 |
| 2013/0091513 A1 * | 4/2013 | Underdal | .............. | G06F 9/4843 |
| | | | | 719/328 |
| 2016/0012104 A1 * | 1/2016 | Petrov | ................... | G06F 16/951 |
| | | | | 707/706 |
| 2016/0062635 A1 * | 3/2016 | Feit | ......................... | G06F 9/485 |
| | | | | 715/765 |
| 2016/0378272 A1 * | 12/2016 | Whitlark | ............... | G06F 3/0481 |
| | | | | 715/750 |
| 2017/0300192 A1 * | 10/2017 | Naour | .............. | H04N 21/47202 |

(Continued)

*Primary Examiner* — Reza Nabi

(57) ABSTRACT

One or more computing devices, systems, and/or methods for providing multi-screen navigation for an application such as a mobile application are provided. An instance of the application is hosted on a mobile device. A primary display interface is populated with a first screen of the application for display through the mobile device. In response to detecting a trigger through the application, a secondary display interface is generated and populated with a second screen of the application for display through the mobile device while the primary display interface is being displayed through the mobile device. A first backstack of the application is utilized to track user navigation amongst screens of the application through the primary display interface. A second backstack of the application is utilized to track user navigation amongst the screens of the application through the secondary display interface.

20 Claims, 13 Drawing Sheets

(56) References Cited

U.S. PATENT DOCUMENTS

| | | | |
|---|---|---|---|
| 2019/0129766 A1* | 5/2019 | Jaroch | A61B 5/16 |
| 2019/0265855 A1* | 8/2019 | SanGiovanni | G06F 3/0482 |
| 2022/0121325 A1* | 4/2022 | Roberts | G06F 3/0481 |
| 2025/0181225 A1* | 6/2025 | Rai | G06F 3/1407 |

* cited by examiner

100

102      103      106

104

SHOPPING APPLICATION

SHOP AUTO
CATEGORY:

SHOP
ELECTRONICS
CATEGORY:

1 2 3
4 5 6
7 8 9
* 0 #

SHOP
VIDEO GAMES
CATEGORY:

VIDEO
GAMES

100 —

102

103

106

104

SHOPPING APPLICATION

SHOP AUTO
CATEGORY:

ELECTRONICS

108

110

SHOP
ELECTRONICS
CATEGORY:

- Shop phones

- Shop laptops

- Shop VR
  headsets

SHOP
VIDEO GAMES
CATEGORY:

- Shop remote
  control cars and
  robots

- ...

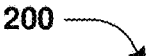

200

HOST INSTANCE OF APPLICATION ON MOBILE DEVICE, WHERE PRIMARY DISPLAY INTERFACE IS POPULATED WITH FIRST SCREEN — 202

UTILIZE FIRST BACKSTACK AND FIRST NAVIGATOR TO TRACK AND FACILITATE USER NAVIGATION THROUGH THE PRIMARY DISPLAY INTERFACE — 204

IN RESPONSE TO DETECTING TRIGGER, GENERATE SECONDARY DISPLAY INTERFACE POPULATED WITH SECOND SCREEN — 206

UTILIZE SECOND BACKSTACK AND SECOND NAVIGATOR TO TRACK AND FACILITATE USER NAVIGATION THROUGH THE SECONDARY DISPLAY INTERFACE — 208

FIG. 2

MULTI-SCREEN VIEW AND NAVIGATION FOR MOBILE APPLICATIONS

BACKGROUND

A mobile device such as a phone, a tablet, a wearable device, or other types of computing devices are capable of executing applications (e.g., mobile applications). For example, a phone may host a mobile application such as a social network application, a news application, an image editing application, a shopping application, and/or a variety of other applications. The mobile application displays content through a single display interface (e.g., a shopping home screen, a checkout screen, a shopping cart screen, etc.) with dedicated functionality for the screen (e.g., the shopping cart screen may include purchase functionality).

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 2 is a flow chart illustrating an example method for providing multi-screen navigation for a mobile application, in accordance with an embodiment of the present technology;

DETAILED DESCRIPTION OF EXAMPLE EMBODIMENTS

Figure 1A:
FIG. 1A illustrates an example of a system for providing multi-screen navigation for a mobile application in accordance with an embodiment of the present technology.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof. The following provides a discussion of some types of computing scenarios in which the disclosed subject matter may be utilized and/or implemented.

Mobile applications generally have a single dedicated display interface. The display interface of a mobile application is used to render screens of the mobile application, such as a home screen, various shopping screens of products for purchase, a shopping cart screen, a checkout screen, and/or other user interface screens of the mobile application. By interacting with the display interface, the user can transition amongst the different screens as a user navigation flow of the mobile application. For example, the user may tap on a video game shopping icon on the home screen. Accordingly, the display interface transitions from displaying the home screen to displaying a video game shopping screen. The user may next tap on a video game icon that brings up additional details of a particular video game and an add to cart button. When the user taps on the add to cart button, the display interface is transitioned to a shopping cart screen with a checkout button and other shopping cart management functionality. When the user taps on the checkout button, the display interface is transitioned to a checkout screen with functionality that can be used by the user to purchase the video game and/or other items in the cart.

The screens occupy the entire display interface (e.g., the entire width and height of a mobile screen) such that there is merely a single user navigation flow (user journey) through the mobile application where the user can either transition forward through various screens or transaction back to previously viewed screens. This limitation of mobile applications is very constraining for the user because the user can only interact with a single display interface that occupies the entire screen of the mobile device. Thus, the user cannot concurrently navigate through different screens of the same mobile application in order to experience different user navigation flows for the mobile application. The user could be provided with separate user navigation flows if multiple instances of the same mobile application were somehow launched and displayed side-by-side. However, this would consume a substantial amount of computing resources because two separate executables would need to be launched and running, which consumes a considerable amount computing resources and battery of the mobile device. There is no ability to provide multiple screen navigation within a single instance of a mobile application.

One or more systems and/or techniques for providing multi-screen navigation for an application such as a mobile application are provided. In particular, a single instance of a mobile application is hosted on a mobile device. The mobile application is visible on a display of the mobile device through a primary display interface that is rendered with content of the mobile application. That is, a screen of the mobile application (e.g., a home screen of news categories, a shopping news screen, a politics news screen, a weather screen, etc.) is displayed through the primary display interface. In some embodiments, the primary display interface may be displayed according to a width and height that fills the display of the mobile device (e.g., the primary display interface may occupy the entire display).

A first backstack of the mobile application is used by a first navigator to track an order with which the user has navigated amongst screens through the primary display interface. When a new screen is displayed through the primary display interface, the first navigator adds an entry of the new screen into the first backstack (e.g., the entry is inserted into a top position of the first backstack to indicate that the primary display interface is currently displaying the new screen). If the user navigates back to a prior screen previously displayed through the primary display interface, then the first navigator utilizes the first backstack to identify an entry of the prior screen to display. In this way, the first backstack and the first navigator are used to facilitate user navigation amongst screens of the mobile application through the primary display interface.

A secondary display interface may be dynamically created in response to a trigger being detected. A monitoring function may be executed to monitor for various triggers that trigger the dynamic creation of the second display interface such as where a user interacts with a shopping news icon of the home screen currently displayed through the primary display interface (e.g., a click event of the shopping news icon). A second backstack of the mobile application (a second backstack of the same instance/executable of the mobile application) is used by a second navigator to track an order with which the user has navigated amongst screens through the secondary display interface. In some embodiments, the second backstack and/or the second navigator are dynamically generated in response to the trigger being detected. The secondary display interface is rendered on the display of the mobile device. The secondary display interface is populated with a screen corresponding to the trigger (e.g., a shopping news screen associated with the click event).

In some embodiments, both the primary display interface and the secondary display interface are visible to the user through the mobile application (e.g., both display interfaces are rendered within a mobile application user interface of the mobile application). In some embodiments, the primary display interface is rendered with a height and width that occupies the entire display of the mobile device, while the secondary display interface is smaller in size compared to the primary display interface and either overlays or replaces the display of a portion of the primary display interface (e.g., the secondary display interface is displayed in replacement of a portion of the primary display interface that is not visible to a user). The user is capable of interacting with both the primary display interface and the secondary display interface (e.g., the user can select buttons, navigate to a new screen, invoke functionality such as purchasing a product, submitting a format, sharing to a social network, etc.), and can dynamically switch between interacting with each of the display interfaces.

When a new screen is displayed through the secondary display interface, the second navigator adds an entry of the new screen into the second backstack (e.g., the entry is inserted into a top position of the second backstack to indicate that the secondary display interface is currently displaying the new screen). If the user navigates back to a prior screen previously displayed through the secondary display interface, then the second navigator utilizes the second backstack to identify an entry of the prior screen to display. In this way, the second backstack and the second navigator are used to facilitate user navigation amongst screens of the mobile application through the secondary display interface.

Implementing multiple backstacks and navigators for the same instance of the mobile application provides the user with the ability to have multiple simultaneous journeys (user navigation flows) through both the primary display interface and the secondary display interface of the same instance of the mobile application. This also greatly reduces the amount of computing resources that would otherwise be consumed if two separate instances of the mobile application were simultaneously executing on the mobile device.

Figure 1B:
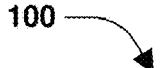
FIG. 1B illustrates an example of a system for providing multi-screen navigation for a mobile application in accordance with an embodiment of the present technology.

FIGS. 1A and 1B illustrate an example of a system 100 for providing multi-screen navigation for an application such as a mobile application. A computing device 102 (e.g., a tablet, a cellular phone, a wearable device, a mobile device, or any other type of device) may host an instance of a shopping application 103. A primary display interface 106 may be rendered on a screen of the computing device 102 so that screens of the shopping application 103 can be displayed through the primary display interface 106. For example, a shopping home screen 104 may be displayed through the primary display interface 106. The user may be able to interact with various elements of the shopping home screen 104, which may invoke corresponding functionality (e.g., adding an item to a cart) and/or cause the primary display interface 106 to navigate from the shopping home screen 104 to a displaying a different screen (e.g., navigating to an account details screen populated with account information of the user with a shopping service of the shopping application 103).

Certain triggers may be defined for triggering the creation and display of a secondary display interface 108, as illustrated by FIG. 1B. Certain user interactions, click events, and/or elements of screens of the shopping application may be associated with triggers. For example, if a user clicks (e.g., a finger touch event is detected on a display of the computing device 102 as a click event) on either a text label "shopping electronics category:" or a cell phone image, then a trigger may be detected (a click event). In response to detecting the trigger, the secondary display interface 108 is created and displayed on the display of the computing device 102 while the primary display interface 106 is still being displayed on the display of the computing device 102. The trigger (click event) may be associated with a particular screen such as an electronics screen 110 that may be rendered within the secondary display interface 108.

The user is able to dynamically interact with (and switch back and forth between interacting with) both the primary display interface 106 and the secondary display interface 108 so that the user experiences a multi-screen navigation experience through the single instance of the shopping application 103 executing on the computing device 102. For example, the user may click/press on a label "shop phones" of the electronics screen 110 of the secondary display interface 108, which may cause the secondary display interface 108 to transition from displaying the electronics screen 110 to displaying a shop phones screen. The secondary display interface 108 may be transitioned while the primary display interface 106 is still visible and displaying the shopping home screen 104. Similarly, the user may navigate amongst various screens through user input interactions performed through the primary display interface 106 while the secondary display interface 108 is still visible and displaying a current screen.

The multi-screen navigation experience is provided through the implementation of multiple backstacks and navigators that are hosted through the same single instance of the shopping application 103. The primary display interface 106 is driven by a first navigator and a first backstack that are used to facilitate user navigation and interaction with screens displayed through the primary display interface 106. The secondary display interface 108 is driven by a second navigator and a second backstack that are used to facilitate user navigation and interaction with screens displayed through the secondary display interface 108.

FIG. 2 is a flow chart illustrating an example method 200 for providing multi-screen navigation for an application such as a mobile application, which is described in conjunction with system 300 of FIGS. 3A-3G. A computing device 302 (e.g., a tablet, a phone, a mobile device, etc.) comprises computing resources 301 such as processors, memory, storage, and/or other resources used to execute applications rendered on a display of the computing device 302. During operation 202 of method 200, an instance of an application such as a news application 303 is hosted on the computing device 302 (e.g., a single executing instance of the news application 303). A primary display interface 306 for the news application 303 is displayed through the display of the computing device 302. The primary display interface 306 is populated with a screen of the news application 303, such as a news home screen 304 that includes various user interface elements of the news application 303.

During operation 204 of method 200, a first backstack 310 and a first navigator 308 are used to facilitate user navigation amongst various screens of the news application 303 through the primary display interface 306. The first navigator 308, executing as part of the instance of the news application 303, is hosted using the computing resources 301 of the computing device 302. The first navigator 308 is configured to monitor for user input events through the primary display interface 306. The user input events pertain to user navigation amongst screens (e.g., a click event of a user interface element such as a button, an image, an item from a drop down list, etc.). The first navigator 308 utilizes the user input to identify a screen to which the primary display interface 306 is to be transitioned (e.g., a click event associated with a particular screen to display next). The first navigator 308 utilizes the user input and/or the first backstack 310 to identify a screen to which the primary display interface 306 is to be transitioned, such as where the first backstack 310 is evaluated to identify a prior screen in response to the user clicking a back button.

The first navigator 308 is configured to use the first backstack 310 to track what screens have been displayed through the primary display interface 306. The first navigator 308 uses the first backstack 310 to identify a prior screen that was previously displayed through the primary display interface 306 so that the user can navigate back to prior screen(s). In particular, when a particular screen (e.g., a first screen) is displayed through the primary display interface 306, an indicator of the first screen is inserted into the first backstack 310 by the first navigator 308. When a different screen (e.g., a second screen) is displayed through the primary display interface 306, an indicator of the second screen is inserted into the first backstack 310 by the first navigator 308 (e.g., the indicator of the second screen is inserted on top of the indicator of the first screen). Similarly, when yet a different screen (e.g., a third screen) is displayed through the primary display interface 306, an indicator of the third screen is inserted into the first backstack 310 by the first navigator 308 (e.g., the indicator of the third screen is inserted on top of the indicator of the second screen).

If the first navigator 308 detects a click event associated with backwards navigation (e.g., clicking a back button), then the first navigator 308 evaluates the first backstack 310 to determine that the indicator of the third screen is on top of the first backstack 310 and that the indicator of the second screen is underneath the indicator of the third screen. Accordingly, the first navigator 308 removes the indicator of the third screen from the first backstack 310 so that the indicator of the second screen is on top of the first backstack 310. In this way, the first navigator 308 will transition the primary display interface 306 from displaying the third screen to displaying the second screen.

Figure 3A:
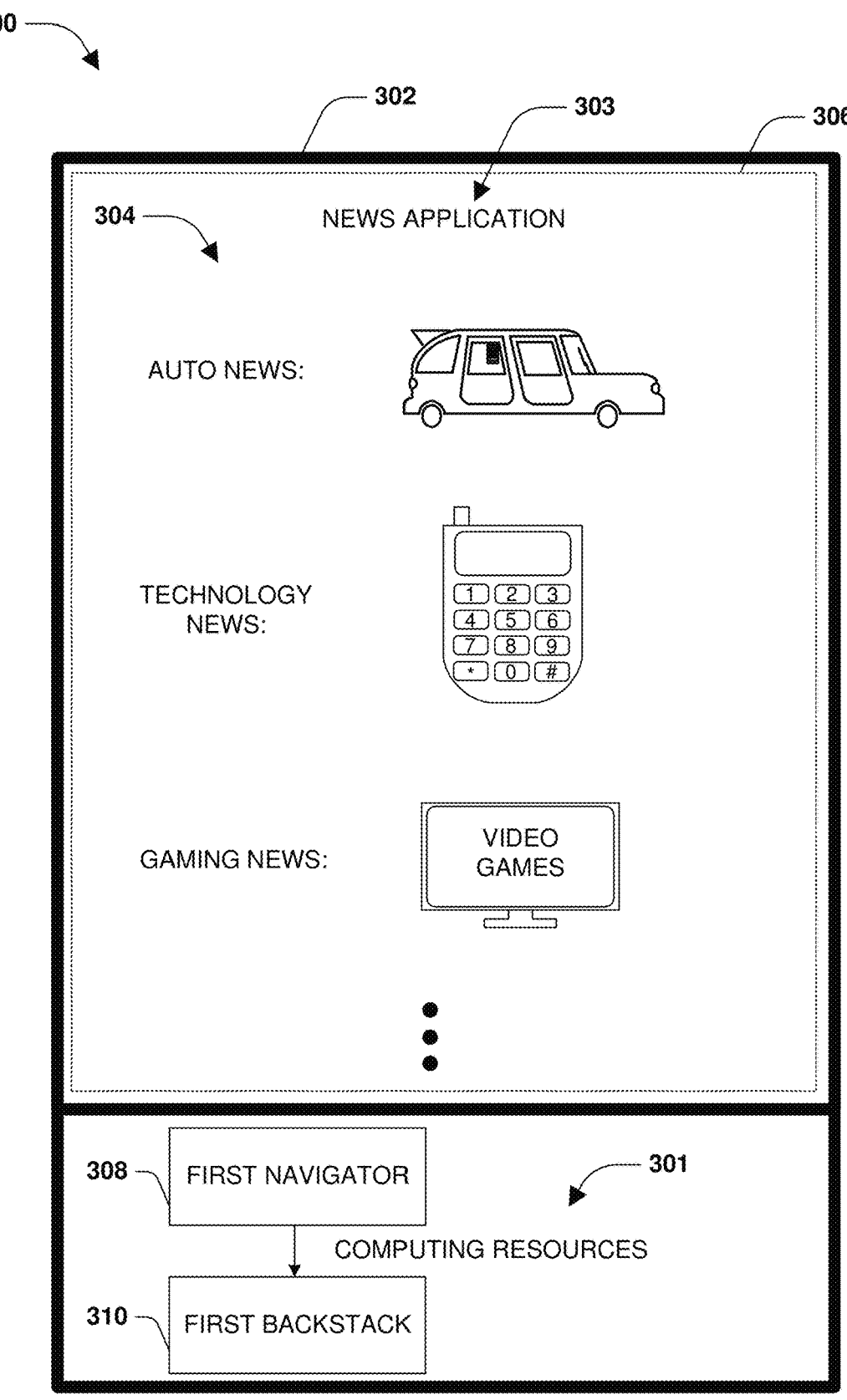
FIG. 3A illustrates an example of a system for providing multi-screen navigation for a mobile application where a primary display interface is displayed through a mobile device, in accordance with an embodiment of the present technology.
Figure 3B:
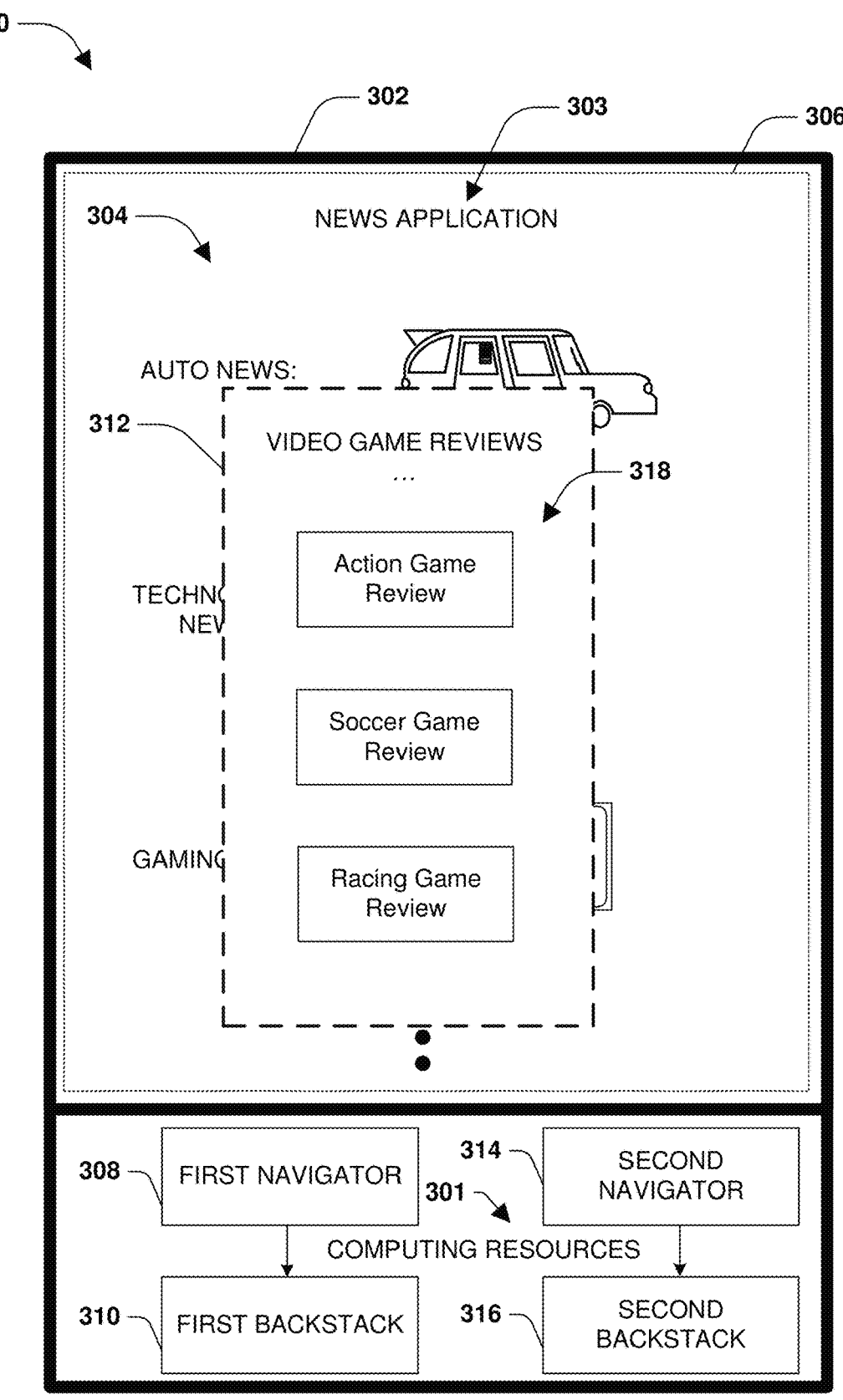
FIG. 3B illustrates an example of a system for providing multi-screen navigation for a mobile application where a secondary display interface is displayed through a mobile device, in accordance with an embodiment of the present technology.

The news application 303 is monitored for a trigger such as a click event of a particular user interface element displayed through the primary display interface 306. In response to detecting the trigger (e.g., the user may click the text label "gaming news" of the new home screen 304 displayed through the primary display interface 306), a secondary display interface 312 is generated, during operation 206 of method 200. The secondary display interface 312 is rendered on the display of the computing device 302, as illustrated by FIG. 3B. The secondary display interface 312 is populated with a particular screen associated with the click event, such as a video game reviews screen 318 that is associated with the click event for the text label "gaming news."

In some embodiments, at least some of the primary display interface 306 and at least some of the secondary display interface 312 is displayed concurrently on the display of the computing device 302. In some embodiments, the primary display interface 306 is displayed according to a first screen size (e.g., a maximum resolution that fills the entire display). The secondary display interface 312 is displayed according to a second screen size that may be smaller than the first screen size. In some embodiments, the secondary display interface 312 is displayed overlying at least a portion of the primary display interface 306. In some embodiments, the primary display interface 306 and the secondary display interface 312 are concurrently displayed within a single user interface of the news application 303. That is, both the primary display interface 306 and the secondary display interface 312 are part of the same executing instance of the news application 303, and are not part of separate executing instances of the news application 303. In some embodiments, a main screen of the news application 303 is created to contain both the primary display interface 306 (e.g., a first box) and the secondary display interface 312 (e.g., a second box).

The secondary display interface 312 can be modified based upon user input. In some embodiments, user input associated with the secondary display interface 312 is received (e.g., a pinch gesture). Accordingly, the secondary display interface 312 may be resized from a first size to a second size such as where the secondary display interface 312 is either expanded or shrunk in size. In some embodiments, user input associated with the secondary display interface 312 is received (e.g., a drag and drop gesture). Accordingly, a display position of the secondary display interface 312 is modified from a first display position to a second display position. In this way, the user can move the secondary display interface 312 anywhere on the display of the computing device 302. In some embodiments, the secondary display interface 312 may be deleted based upon user input (e.g., a user flicking the secondary display interface 312 or clicking a close button for the secondary display interface 312). In some embodiments, the second navigator 314 and/or the second backstack 316 may also be deleted (e.g., removed from memory) in order to reduce resource utilization by the news application 303.

During operation 208 of method 200, a second backstack 316 and a second navigator 314 are hosted through the instance of the news application 303 for tracking and facilitating user navigation through the secondary display interface 312. The second navigator 314 of the instance of the news application 303 is hosted using the computing resources 301 of the computing device 302. The second navigator 314 is configured to monitor for user input events through the secondary display interface 312 that pertain to user navigation amongst screens (e.g., a click event of a user interface element such as a button, an image, an item from a drop down list, etc. of the video game reviews screen 318). The second navigator 314 utilizes the user input to identify a screen to which the secondary display interface 312 is to be transitioned (e.g., a click event associated with a particular screen to display next). The second navigator 314 utilizes the user input and/or the second backstack 316 to identify a screen to which the secondary display interface 312 is to be transitioned, such as where the second backstack 316 is evaluated to identify a prior screen in response to the user clicking a back button.

The second navigator 314 is configured to use the second backstack 316 to track what screens have been displayed through the secondary display interface 312. The second navigator 314 uses the second backstack 316 to identify a prior screen that was previously displayed through the secondary display interface 312 so that the user can navigate back to prior screens. In particular, when a particular screen (e.g., a first screen) is displayed through the secondary display interface 312, an indicator of the first screen is inserted into the second backstack 316 by the second navigator 314. When a different screen (e.g., a second screen) is displayed through the secondary display interface 312, an indicator of the second screen is inserted into the second backstack 316 by the second navigator 314 (e.g., the indicator of the second screen is inserted on top of the indicator of the first screen). Similarly, when yet a different screen (e.g., a third screen) is displayed through the secondary display interface 312, an indicator of the third screen is inserted into the second backstack 316 by the second navigator 314 (e.g., the indicator of the third screen is inserted on top of the indicator of the second screen).

If the second navigator 314 detects a click event associated with backwards navigation (e.g., clicking a back button), the second navigator 314 evaluates the second backstack 316 to determine that the indicator of the third screen is on top of the second backstack 316 and that the indicator of the second screen is underneath the indicator of the third screen. Accordingly, the second navigator 314 removes the indicator of the third screen from the second backstack 316 so that the indicator of the second screen is on top of the second backstack 316. In this way, the second navigator 314 will transition the secondary display interface 312 from displaying the third screen to displaying the second screen.

The primary display interface 306, the secondary display interface 312, the first navigator 308, the first backstack 310, the second navigator 314, and/or the second backstack 316 are hosted as part of the same executing instance of the news application 303 and are not separated into different instances of the news application 303. The first navigator 308 and the second navigator 314 concurrently monitor for user input events through the respective display interfaces. That is, the first navigator 308 monitors the primary display interface 306 for user input events through the primary display interface 306, while the second navigator 314 monitors the secondary display interface 312 for user input events through the secondary display interface 312. In this way, the primary display interface 306 and the secondary display interface 312 are dynamically populated with content controlled through user input (e.g., user navigation input to navigate amongst different screens, a user invoking functionality such as checkout and purchase functionality, functionality to fill out and submit a form, etc.). This allows for two separate user journeys through the news application 303 utilizing the different display interfaces.

Figure 3C:
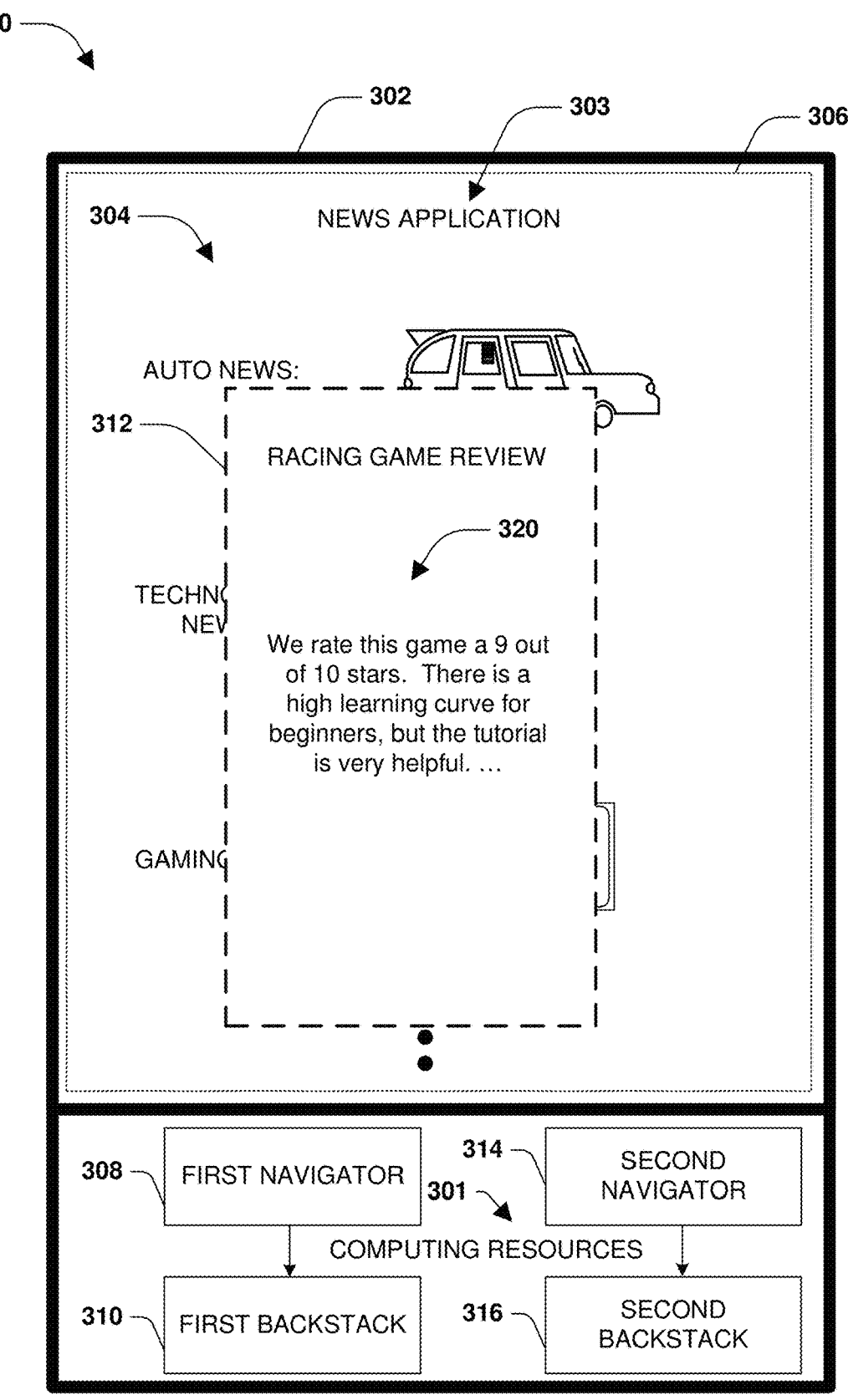
FIG. 3C illustrates an example of a system for providing multi-screen navigation for a mobile application where a secondary display interface is transitioned between displaying different screens, in accordance with an embodiment of the present technology.

FIG. 3C illustrates an embodiment of the secondary display interface 312 being transitioned from displaying the video game reviews screen 318 to displaying a racing game review screen 320. In some embodiments, the second navigator 314 monitors the secondary display interface 312 for a user input event. The second navigator 314 may detect that the user clicked a racing game review button of the video game reviews screen 318 populated within the secondary display interface 312. The second navigator 314 evaluates programming code or other information associated with the news application 303 (e.g., a description of a click event assigned to the racing game review button) to determine that the racing game review button is associated with the racing game review screen 320. Accordingly, the second navigator 314 renders the racing game review screen 320 through the secondary display interface 312. The second navigator 314 inserts an indicator of the racing game review screen 320 into the second backstack 316 (e.g., inserts the indicator at a top position within the second backstack 316).

Figure 3D:
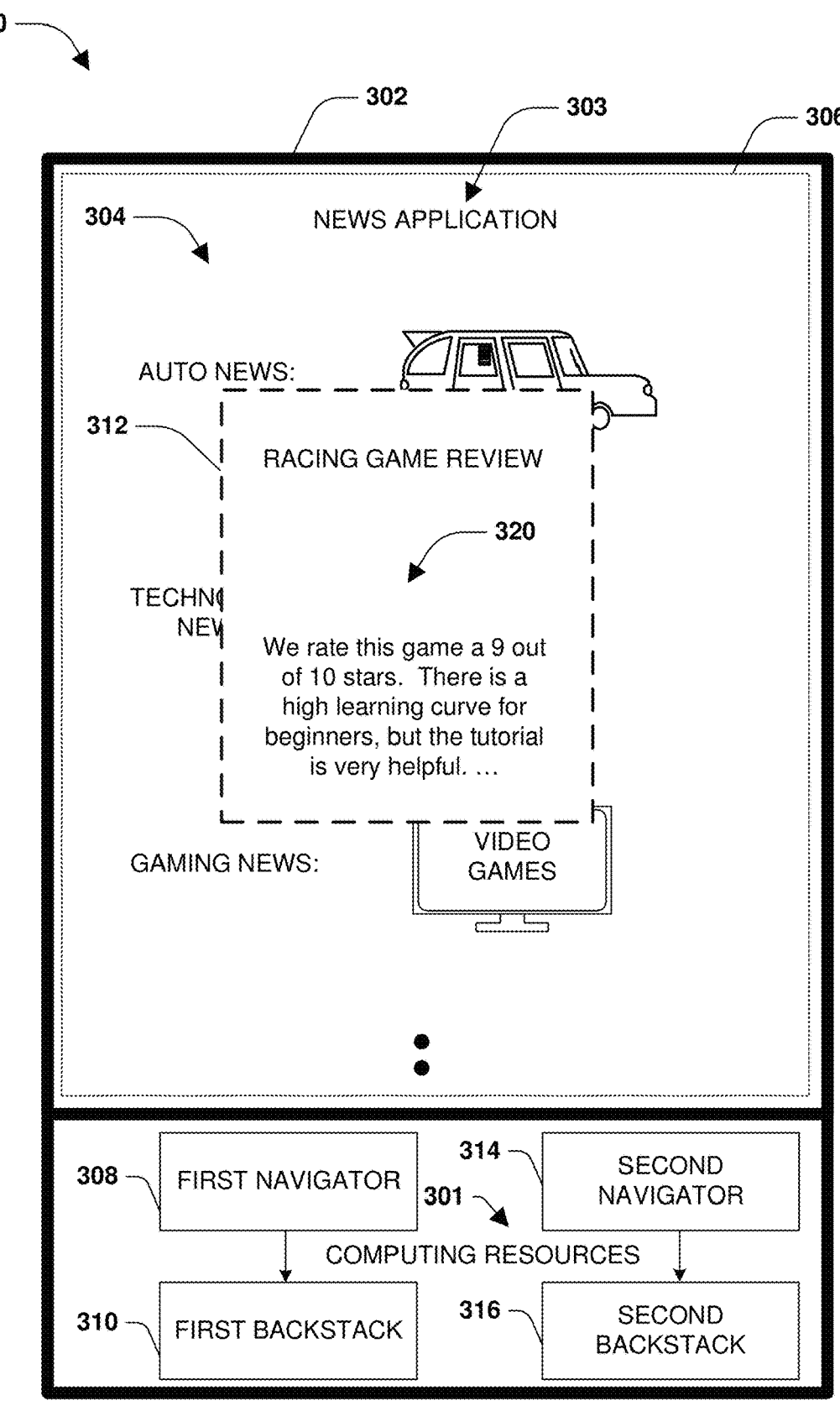
FIG. 3D illustrates an example of a system for providing multi-screen navigation for a mobile application where a secondary display interface is resized, in accordance with an embodiment of the present technology.

FIG. 3D illustrates an embodiment of the secondary display interface 312 being resized. In particular, user input with the secondary display interface 312 through the display of the computing device 302 may be monitored. In response to receiving user input associated with the user resizing the secondary display interface 312, the size of the secondary display interface 312 is modified such as shrunk.

Figure 3E:
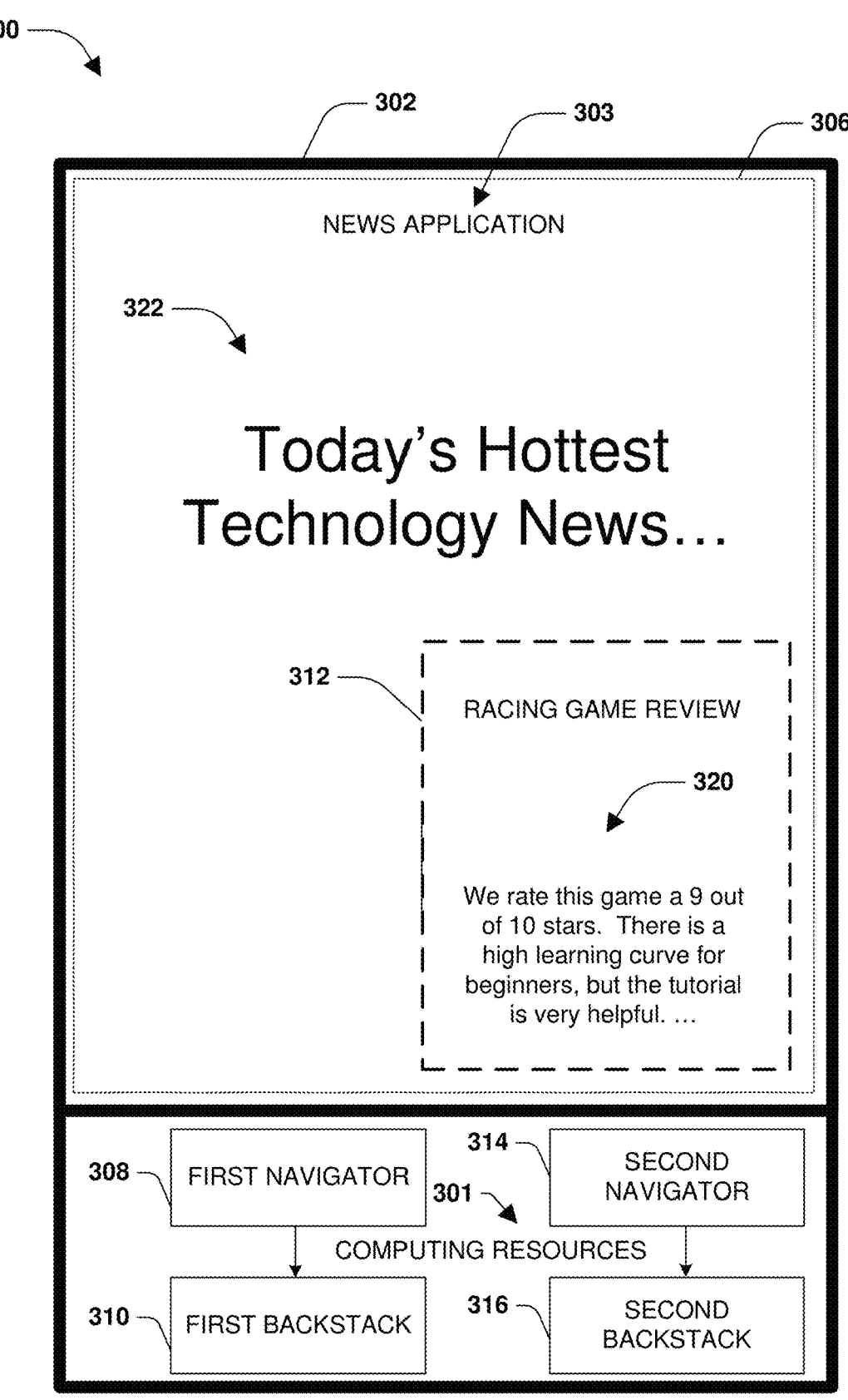
FIG. 3E illustrates an example of a system for providing multi-screen navigation for a mobile application where a secondary display interface is repositioned and a first display interface is transitioned between displaying different screens, in accordance with an embodiment of the present technology.

FIG. 3E illustrates an embodiment of the secondary display interface 312 being repositioned. In particular, user input with the secondary display interface 312 through the display of the computing device 302 may be monitored. In response to receiving user input associated with the user repositioning the secondary display interface 312 (e.g., a drag and drop input), a current position of the secondary display interface 312 is modified such as where the secondary display interface 312 is moved to a lower right corner of the display of the computing device 302. Additionally, the first navigator 308 may detect user input through the primary display interface 306 that causes the first navigator 308 to transition the primary display interface 306 from displaying the news home screen 304 to displaying a technology news screen 322. The first navigator 308 updates/modifies the first backstack 310 by inserting an indicator of the news home screen 304 into the first backstack 310.

Figure 3F:
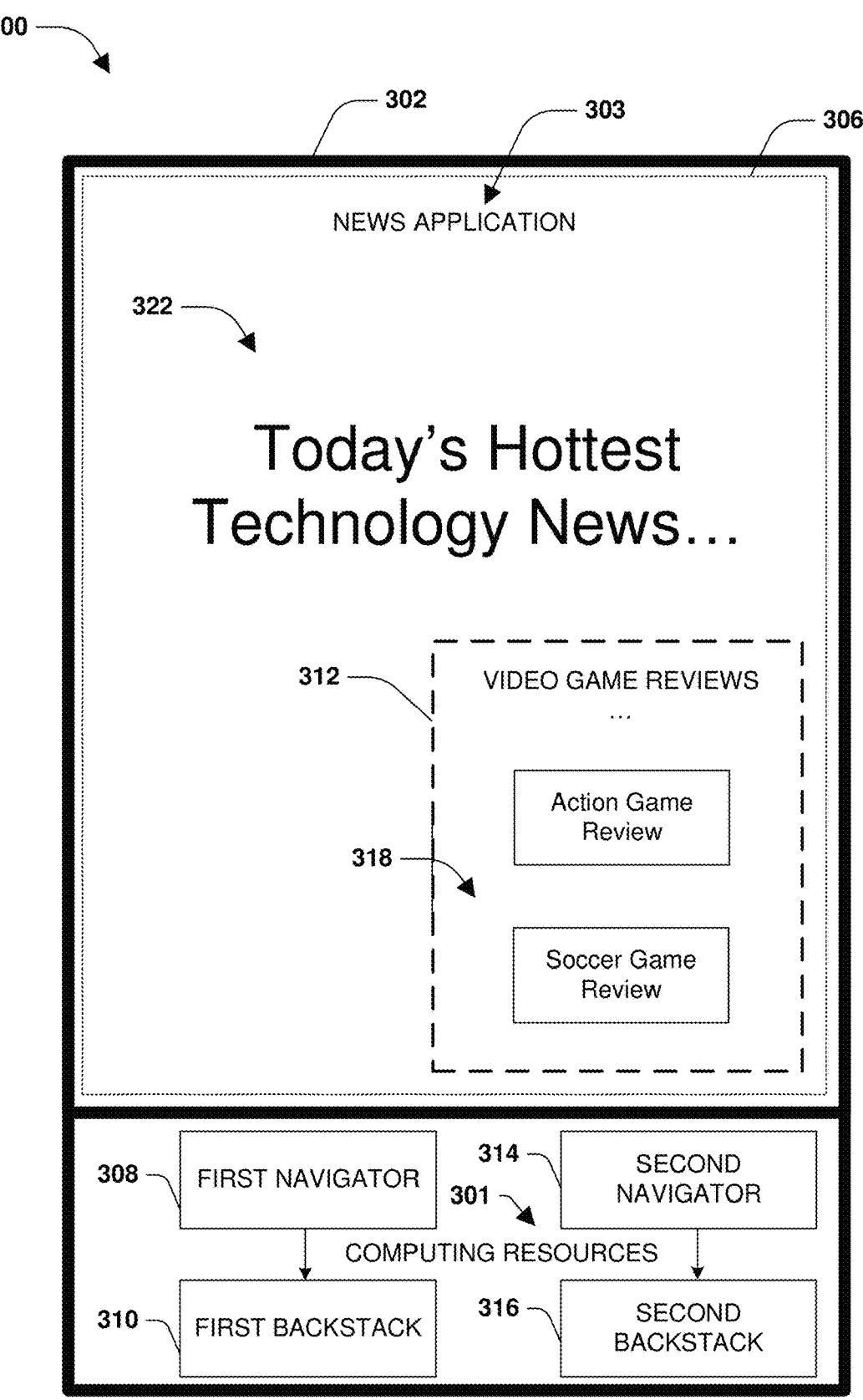
FIG. 3F illustrates an example of a system for providing multi-screen navigation for a mobile application where a secondary display interface is transitioned between displaying different screens, in accordance with an embodiment of the present technology.

FIG. 3F illustrates an embodiment of the secondary display interface 312 being transitioned from displaying the racing game review screen 320 to displaying the video game reviews screen 318. In some embodiments, the second navigator 314 monitors the secondary display interface 312 for a user input event. The second navigator 314 may detect that the user clicked a back button populated within the secondary display interface 312. The second navigator 314 evaluates the second backstack 316 to determine that the prior screen displayed through the secondary display interface 312 before the racing game review screen 320 was the video game reviews screen 318. Accordingly, the second navigator 314 renders the video game reviews screen 318 through the secondary display interface 312. The second navigator 314 removes the indicator of the racing game review screen 320 from the second backstack 316. The second navigator 314 inserts an indicator of the video game reviews screen 318 into the second backstack 316 (e.g., inserts the indicator at a top position within the second backstack 316).

Figure 3G:
FIG. 3G illustrates an example of a system for providing multi-screen navigation for a mobile application where a secondary display interface is deleted and removed from view, in accordance with an embodiment of the present technology.

FIG. 3G illustrates an embodiment of the secondary display interface 312 being deleted. The secondary display interface 312 may be deleted based upon user input (e.g., a user flicking the secondary display interface 312 or clicking a close button for the secondary display interface 312). In some embodiments, the second navigator 314 and/or the second backstack 316 may also be deleted (e.g., removed from memory) in order to reduce compute resource utilization by the news application 303.

In some embodiments, a framework is provided for users (developers) of applications such as the news application to define how the secondary display interface 312 may be implement. A developer may utilize the framework to define what screens of the news application 303 are eligible to be displayed through the secondary display interface 312. If a screen is not defined as being eligible, then navigation to that screen will be constrained to being displayed through the primary display interface 306. In some embodiments, a tag or other indicator may be associated with a click event, user interface element, and/or a screen to indicate that the secondary display interface 312 should be utilized, otherwise the primary display interface 306 is used as a default display interface.

According to some embodiments, a method is provided. The method includes hosting an instance of an application on a mobile device, wherein a primary display interface is populated with a first screen of the application for display through the mobile device. The method includes: in response to detecting a trigger through the application, generating a secondary display interface populated with a second screen of the application for display through the mobile device while the primary display interface is being displayed through the mobile device. The method includes utilizing a first backstack of the application to track user navigation amongst screens of the application through the primary display interface. The method includes utilizing a second backstack of the application to track user navigation amongst the screens of the application through the secondary display interface.

According to some embodiments, the method includes hosting a first navigator that utilizes the first backstack to facilitate the user navigation amongst the screens of the application through the primary display interface, and hosting a second navigator that utilizes the second backstack to facilitate the user navigation amongst the screens of the application through the secondary display interface.

According to some embodiments, the method includes receiving, by the second navigator, a user input through the secondary display interface; evaluating the second backstack to identify a next screen to display based upon the user input; and populating the secondary display interface with the next screen.

According to some embodiments, the method includes modifying the second backstack based upon the secondary display interface being transitioned from displaying the second screen to displaying a next screen.

According to some embodiments, the primary display interface, the secondary display interface, the first navigator, and the second navigator are hosted as part of executing the instance of the application.

According to some embodiments, the primary display interface is displayed according to a first screen size, the secondary display interface is displayed according to a second screen size smaller than the first screen size.

According to some embodiments, a first portion, but not a second portion, of the primary display interface is displayed through the mobile device, and wherein the secondary display interface is displayed through the mobile device to overlay or replace the second portion of the primary display interface.

According to some embodiments, the method includes in response to receiving user input associated with the secondary display interface, resizing the secondary display interface from a first size to a second size.

According to some embodiments, the method includes in response to receiving user input associated with the secondary display interface, modifying a display position of the secondary display interface from a first display position to a second display position.

According to some embodiments, the primary display interface, the secondary display interface, the first backstack, and the second backstack are part of executing the instance of the application.

According to some embodiments, a device comprising one or more processors configured to host an instance of an application on a mobile device, wherein a primary display interface is populated with a first screen of the application for display through the mobile device. The one or more processors are configured to: in response to detecting a trigger through the application, generate a secondary display interface populated with a second screen of the application for display through the mobile device while the primary display interface is being displayed through the mobile device. The one or more processors are configured to utilize a first backstack of the application to track user navigation amongst screens of the application through the primary display interface. The one or more processors are configured to utilize a second backstack of the application to track user navigation amongst the screens of the application through the secondary display interface.

According to some embodiments, the one or more processors are configured to display the primary display interface and the secondary display interface within a single user interface of the application.

According to some embodiments, in response to receiving user input, the one or more processors are configured to delete the secondary display interface.

According to some embodiments, the one or more processors are configured to host a first navigator that utilizes the first backstack to facilitate the user navigation amongst screens of the application through the primary display interface, and host a second navigator that utilizes the second backstack to facilitate the user navigation amongst screens of the application through the secondary display interface, wherein the first navigator and the second navigator concurrently monitors for user input events.

According to some embodiments, the first navigator monitors the primary display interface for the user input events and the second navigator monitors the secondary display interface for the user input events.

According to some embodiments, a non-transitory computer-readable medium storing instructions that when executed, by one or more processors, facilitate performance of operations, is provided. The operations include hosting an instance of an application on a mobile device, wherein a primary display interface is populated with a first screen of the application for display through the mobile device. The operations include: in response to detecting a trigger through the application, generating a secondary display interface populated with a second screen of the application for display through the mobile device while the primary display interface is being displayed through the mobile device. The operations include utilizing a first backstack of the application to track user navigation amongst screens of the application through the primary display interface. The operations include utilizing a second backstack of the application to track user navigation amongst the screens of the application through the secondary display interface.

According to some embodiments, the operations include hosting a first navigator that utilizes the first backstack to facilitate the user navigation amongst screens of the application through the primary display interface, and hosting a second navigator that utilizes the second backstack to facilitate the user navigation amongst screens of the application through the secondary display interface.

According to some embodiments, the first navigator and the second navigator concurrently monitor for user input events, wherein the first navigator monitors the primary display interface for the user input events and the second navigator monitors the secondary display interface for the user input events.

According to some embodiments, the primary display interface and the secondary display interface are dynamically populated with content controlled through user input.

According to some embodiments, the primary display interface, the secondary display interface, the first backstack, and the second backstack are hosted as part of the application.

Figure 4:
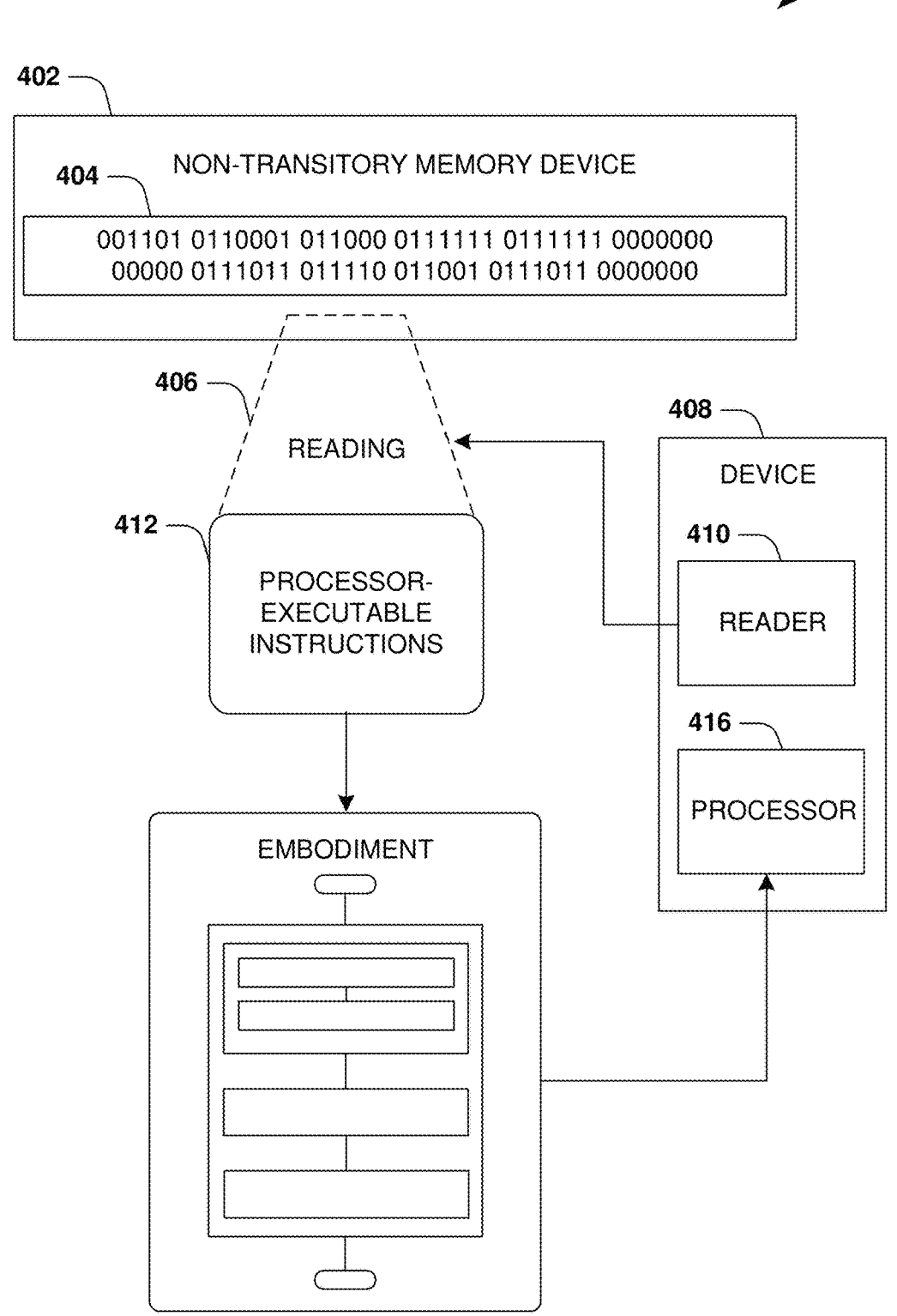
FIG. 4 is an illustration of example networks that may utilize and/or implement at least a portion of the techniques presented herein.

FIG. 4 is an illustration of a scenario 400 involving an example non-transitory machine readable medium 402. The non-transitory machine readable medium 402 may comprise processor-executable instructions 412 that when executed by a processor 416 cause performance (e.g., by the processor 416) of at least some of the provisions herein. The non-transitory machine readable medium 402 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 402 stores computer-readable data 404 that, when subjected to reading 406 by a reader 410 of a device 408 (e.g., a read head of a hard disk drive, or a read operation invoked on a solid-state storage device), express the processor-executable instructions 412. In some embodiments, the processor-executable instructions 412, when executed cause performance of operations, such as at least some of the example method 200 of FIG. 2, for example. In some embodiments, the processor-executable instructions 412 are configured to cause implementation of a system, such as at least some of the example system 100 of FIG. 1 and/or at least some of the example system 300 of FIGS. 3A-3G.

Figure 5:
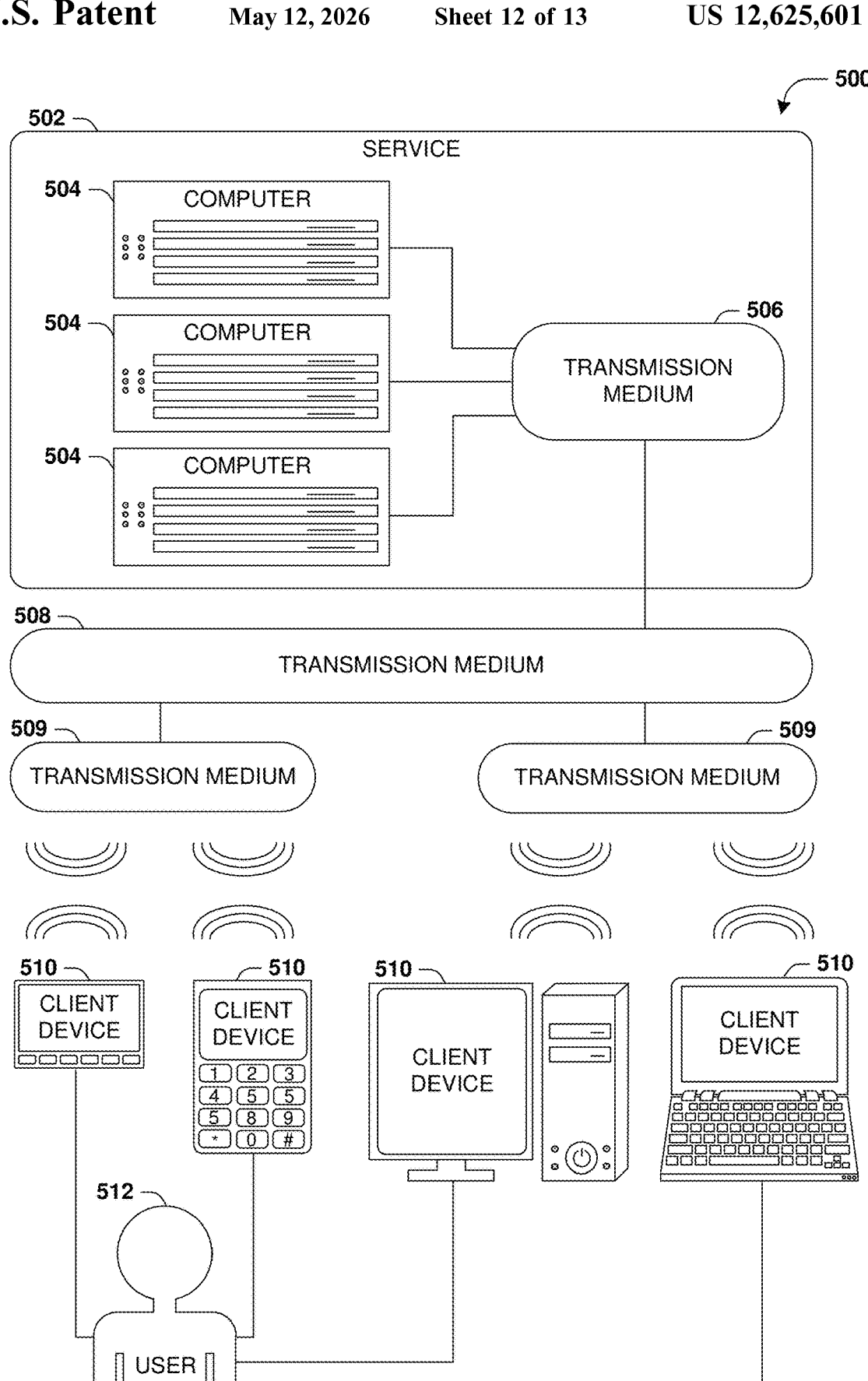
FIG. 5 is an illustration of a scenario involving an example configuration of a computer that may utilize and/or implement at least a portion of the techniques presented herein.

FIG. 5 is an interaction diagram of a scenario 500 illustrating a service 502 provided by a set of computers 504 to a set of client devices 510 via various types of transmission mediums. The computers 504 and/or client devices 510 may be capable of transmitting, receiving, processing, and/or storing many types of signals, such as in memory as physical memory states.

In some embodiments, the computers 504 may be host devices and/or the client device 510 may be devices attempting to communicate with the computer 504 over buses for which device authentication for bus communication is implemented.

The computers 504 of the service 502 may be communicatively coupled together, such as for exchange of communications using a transmission medium 506. The transmission medium 506 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 502.

Likewise, the transmission medium 506 may comprise one or more sub-networks, such as may employ different architectures, may be compliant or compatible with differing protocols and/or may interoperate within the transmission medium 506. Additionally, various types of transmission medium 506 may be interconnected (e.g., a router may provide a link between otherwise separate and independent transmission medium 506).

In scenario 500 of FIG. 5, the transmission medium 506 of the service 502 is connected to a transmission medium 508 that allows the service 502 to exchange data with other services 502 and/or client devices 510. The transmission medium 508 may encompass various combinations of devices with varying levels of distribution and exposure, such as a public wide-area network and/or a private network (e.g., a virtual private network (VPN) of a distributed enterprise).

In the scenario 500 of FIG. 5, the service 502 may be accessed via the transmission medium 508 by a user 512 of one or more client devices 510, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 510 may communicate with the service 502 via various communicative couplings to the transmission medium 508. As a first such example, one or more client devices 510 may comprise a cellular communicator and may communicate with the service 502 by connecting to the transmission medium 508 via a transmission medium 509 provided by a cellular provider. As a second such example, one or more client devices 510 may communicate with the service 502 by connecting to the transmission medium 508 via a transmission medium 509 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 504 and the client devices 510 may communicate over various types of transmission mediums.

Figures 6, 7:
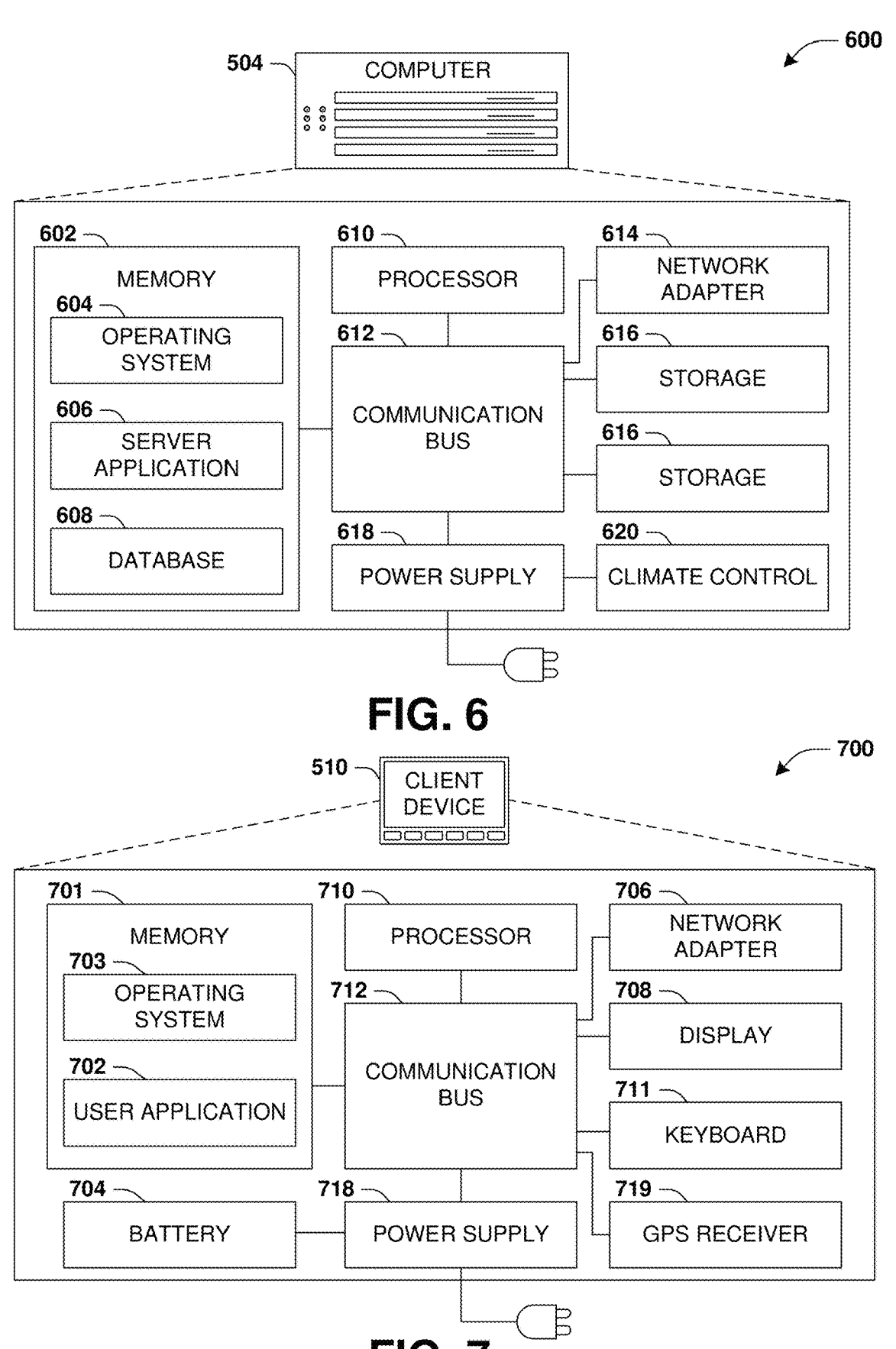
FIG. 6 is an illustration of a scenario involving an example configuration of a client that may utilize and/or implement at least a portion of the techniques presented herein.
FIG. 7 is an illustration of a scenario featuring an example non-transitory machine-readable medium in accordance with one or more of the provisions set forth herein.

FIG. 6 presents a schematic architecture diagram 600 of a computer 604 that may utilize at least a portion of the techniques provided herein. Such a computer 604 may vary widely in configuration or capabilities, alone or in conjunction with other computers, in order to provide a service.

The computer 604 may comprise one or more processors 610 that process instructions. The one or more processors 610 may optionally include a plurality of cores; one or more coprocessors, such as a mathematics coprocessor or an integrated graphical processing unit (GPU); and/or one or more layers of local cache memory. The computer 604 may comprise memory 602 storing various forms of applications, such as an operating system 604; one or more computer applications 606; and/or various forms of data, such as a database 608 or a file system. The computer 604 may comprise a variety of peripheral components, such as a wired and/or wireless network adapter 614 connectible to a local area network and/or wide area network; one or more storage components 616, such as a hard disk drive, a solid-state storage device (SSD), a flash memory device, and/or a magnetic and/or optical disk reader.

The computer 604 may comprise a mainboard featuring one or more communication buses 612 that interconnect the processor 610, the memory 602, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 612 may interconnect the computer 604 with at least one other computer. Other components that may optionally be included with the computer 604 (though not shown in the schematic architecture diagram 600 of FIG. 6) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 618 that supplies and/or regulates power for the other components. The computer 604 may provide power to and/or receive power from another computer and/or other devices. The computer 604 may comprise a shared and/or dedicated climate control unit 620 that regulates climate properties, such as temperature, humidity, and/or airflow. Many such computers 604 may be configured and/or adapted to utilize at least a portion of the techniques presented herein.

FIG. 7 presents a schematic architecture diagram 700 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 708; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The client device 610 may comprise memory 701 storing various forms of applications, such as an operating system 703; one or more user applications 702, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 706 connectible to a local area network and/or wide area network; one or more output components, such as a display 708 coupled with a display adapter (optionally including a graphical processing unit (GPU)), a sound adapter coupled with a speaker, and/or a printer; input devices for receiving input from the user, such as a keyboard 711, a mouse, a microphone, a camera, and/or a touch-sensitive component of the display 708; and/or environmental sensors, such as a global positioning system (GPS) receiver 719 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 700 of FIG. 7) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 712 that interconnect the processor 710, the memory 701, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 718 that supplies and/or regulates power for other components, and/or a battery 704 that stores power for use while the client device 610 is not connected to a power source via the power supply 718. The client device 610 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

What is claimed:

1. A method, comprising:

hosting a single instance of an application on a mobile device, wherein a primary display interface is populated with a first screen of the application for display through the mobile device;

in response to detecting a trigger through the primary display interface of the application, generating a secondary display interface populated with a second screen of the same application for display through the mobile device while the primary display interface is being displayed through the mobile device;

utilizing a first backstack of the single instance of the application to track user navigation amongst screens of the application through the primary display interface; and utilizing a second backstack of the single instance of the application to track user navigation amongst the screens of the application through the secondary display interface.

2. The method of claim 1, comprising:

hosting a first navigator that utilizes the first backstack to facilitate the user navigation amongst the screens of the application through the primary display interface, and hosting a second navigator that utilizes the second back-stack to facilitate the user navigation amongst the screens of the application through the secondary display interface.

3. The method of claim 2, comprising:

receiving, by the second navigator, a user input through the secondary display interface;

evaluating the second backstack to identify a next screen to display based upon the user input; and populating the secondary display interface with the next screen.

4. The method of claim 2, comprising:

modifying the second backstack based upon the secondary display interface being transitioned from displaying the second screen to displaying a next screen.

5. The method of claim 2, wherein the primary display interface, the secondary display interface, the first navigator, and the second navigator are hosted as part of executing the single instance of the application.

6. The method of claim 1, wherein the primary display interface is displayed according to a first screen size, the secondary display interface is displayed according to a second screen size smaller than the first screen size.

7. The method of claim 1, wherein a first portion, but not a second portion, of the primary display interface is displayed through the mobile device, and wherein the secondary display interface is displayed through the mobile device to overlay or replace the second portion of the primary display interface.

8. The method of claim 1, comprising:

in response to receiving user input associated with the secondary display interface, resizing the secondary display interface from a first size to a second size.

9. The method of claim 1, comprising:

in response to receiving user input associated with the secondary display interface, modifying a display position of the secondary display interface from a first display position to a second display position.

10. The method of claim 1, wherein the primary display interface, the secondary display interface, the first backstack, and the second backstack are part of executing the single instance of the application.

11. A device comprising one or more processors configured to:

host a single instance of an application on a mobile device, wherein a primary display interface is populated with a first screen of the application for display through the mobile device;

in response to detecting a trigger through the primary display interface of the application, generate a secondary display interface populated with a second screen of the same application for display through the mobile device while the primary display interface is being displayed through the mobile device;

utilize a first backstack of the single instance of the application to track user navigation amongst screens of the application through the primary display interface; and utilize a second backstack of the single instance of the application to track user navigation amongst the screens of the application through the secondary display interface.

12. The device of claim 11, wherein the one or more processors are further configured to:

concurrently display the primary display interface and the secondary display interface within a single user interface of the application.

13. The device of claim 11, wherein in response to receiving user input, the one or more processors are configured to delete the secondary display interface.

14. The device of claim 11, wherein the one or more processors are further configured to:

host a first navigator that utilizes the first backstack to facilitate the user navigation amongst screens of the application through the primary display interface, and host a second navigator that utilizes the second backstack to facilitate the user navigation amongst screens of the application through the secondary display interface, wherein the first navigator and the second navigator concurrently monitor for user input events.

15. The device of claim 14, wherein the first navigator monitors the primary display interface for the user input events and the second navigator monitors the secondary display interface for the user input events.

16. A non-transitory computer-readable medium storing instructions that when executed, by one or more processors, facilitate performance of operations comprising:

hosting a single instance of an application on a mobile device, wherein a primary display interface is populated with a first screen of the application for display through the mobile device;

in response to detecting a trigger through the application, generating a secondary display interface populated with a second screen of the same application for display through the mobile device while the primary display interface is being displayed through the mobile device;

utilizing a first backstack of the single instance of the application to track user navigation amongst screens of the application through the primary display interface; and utilizing a second backstack of the single instance of the application to track user navigation amongst the screens of the application through the secondary display interface.

17. The non-transitory computer-readable medium of claim 16, wherein the operations further comprise:

hosting a first navigator that utilizes the first backstack to facilitate the user navigation amongst screens of the application through the primary display interface, and hosting a second navigator that utilizes the second backstack to facilitate the user navigation amongst screens of the application through the secondary display interface.

18. The non-transitory computer-readable medium of claim 17, wherein the first navigator and the second navigator concurrently monitor for user input events, wherein the first navigator monitors the primary display interface for the user input events and the second navigator monitors the secondary display interface for the user input events.

19. The non-transitory computer-readable medium of claim 16, wherein the primary display interface and the secondary display interface are dynamically populated with content controlled through user input.

20. The non-transitory computer-readable medium of claim 16, wherein the primary display interface, the secondary display interface, the first backstack, and the second backstack are hosted as part of the application.

* * * * *